United States Patent
Clynne et al.

(10) Patent No.: US 10,402,958 B2
(45) Date of Patent: Sep. 3, 2019

(54) SYSTEMS AND METHODS FOR WINDOW CONTAMINATION DETECTION

(71) Applicant: General Electric Company, Schenectady, NY (US)

(72) Inventors: Thomas Clynne, East Cleveland, OH (US); Rick Dean Dureiko, Willoughby, OH (US); Jonathan Robert Meyer, Shaker Heights, OH (US); Koushik Babi Saha, Strongsville, OH (US)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 4 days.

(21) Appl. No.: 15/480,008

(22) Filed: Apr. 5, 2017

(65) Prior Publication Data
US 2018/0082417 A1 Mar. 22, 2018

Related U.S. Application Data

(60) Provisional application No. 62/398,123, filed on Sep. 22, 2016.

(51) Int. Cl.
*H04N 5/225* (2006.01)
*H04N 5/235* (2006.01)
(Continued)

(52) U.S. Cl.
CPC ........ *G06T 7/0002* (2013.01); *G02B 27/0006* (2013.01); *H04N 5/2252* (2013.01);
(Continued)

(58) Field of Classification Search
CPC ........ G06T 7/0002; G06T 2207/30168; H04N 5/2354; H04N 5/2256; H04N 5/2252; G02B 27/0006
See application file for complete search history.

(56) References Cited

U.S. PATENT DOCUMENTS 5,650,621 A * 7/1997 Tsuneta ............... H01J 37/252 250/311
6,327,374 B1 * 12/2001 Piironen ............. G01B 11/303 382/108

(Continued)

OTHER PUBLICATIONS

Dechow, D., "Explore the Fundamentals of Machine Vision: Part I," Retrieved from Internet URL: http://www.vision-systems.com/articles/print/volume-18/issue-2/departments/leading-edge-views/explore-the-fundamentals-of-machine-vision-part-i-html on Dec. 27, 2017, pp. 1-4 (Feb. 1, 2013).

*Primary Examiner* — Hung H Lam
(74) *Attorney, Agent, or Firm* — Buckley, Maschoff & Talwalkar, LLC (57) ABSTRACT

A system includes an imaging system having a housing with a window, an imaging device within the housing having a field-of-view containing at least a portion of the window, a dark-field illuminator source within the housing directed at that portion of the window within the field-of-view, a control processor in communication with the imaging device and configured to execute instructions that cause the imaging device to acquire a first series of images with the dark-field illuminator source not activated, the control processor configured to control activation of the dark-field illuminator source, the imaging device configured to capture additional images during acquisition of the first series of images, the additional images captured during periods when the dark-field illuminator source is activated. In some implementations, dark-field illuminator can be synched with frame acquisition rate of the first series of images. A method and a non-transitory computer readable medium are also disclosed.

14 Claims, 8 Drawing Sheets

(51) Int. Cl.
*G06T 7/00* (2017.01)
*G02B 27/00* (2006.01)
*H04N 5/232* (2006.01)

(52) U.S. Cl.
CPC .......... *H04N 5/2256* (2013.01); *H04N 5/232* (2013.01); *H04N 5/2354* (2013.01); *G06T 2207/30168* (2013.01)

(56) References Cited

U.S. PATENT DOCUMENTS

| | | | |
|---|---|---|---|
| 9,482,622 B2 * | 11/2016 | Sato | G01N 21/84 |
| 2005/0168729 A1 * | 8/2005 | Jung | G01N 21/8806 356/237.2 |
| 2008/0198602 A1 * | 8/2008 | Brittain | G01N 21/896 362/253 |
| 2017/0082522 A1 * | 3/2017 | Tan | G01N 21/958 |

* cited by examiner

SYSTEMS AND METHODS FOR WINDOW CONTAMINATION DETECTION

CLAIM OF PRIORITY

This patent application claims the benefit of priority, under 35 U.S.C. § 119(e), of U.S. Provisional Patent Application Ser. No. 62/398,123, filed Sep. 22, 2016, titled "Systems and Methods for Window Contamination Detection" the entire disclosure of which is incorporated herein by reference.

BACKGROUND

Contamination on a window of an optical imaging system housing can degrade the image quality obtained by the imaging system. The elimination of this "noise" greatly improves the fidelity of the data being generated. The elimination of optical noise makes the data being generated from an analytics system more reliable and the overall performance of the system better, thereby making it more valuable.

Dirty windows on an imaging system are not desired, and an effective way to detect this automatically is highly desired. A human in-the-loop could conceivably look at each image and make a call as to whether or not the windows needed to be cleaned. This is somewhat impractical for a large installation of thousands of systems. A system operator could just periodically clean all of the windows on a scheduled basis.

DETAILED DESCRIPTION

Embodying systems and methods can autonomously detect contamination on windows used to cover and protect cameras, and other imaging systems used in outdoor roadway vision and sensor systems. In accordance with embodiments, critical levels of detected contamination can trigger amelioration systems that clear the contaminants from the window, and report transmission to a remote location.

Windows of glass or other transparent material can be placed on housings containing the optical imaging system to protect the imaging system from the environment as well as make them less obvious to the casual observer.

The window surfaces themselves can get dirty over time, as well as may accumulate fog, ice buildup or water droplets during the natural course of the operation of the system. This dirt and other contamination can negatively alter the quality of the images which are being acquired through them. While it is expected that it can be necessary to clean the windows in the system periodically, this interval should be adjusted to maximize the time between cleanings to maintain a level of cost effectiveness.

The detection of water, ice or fog on the windows can be used as a trigger mechanism for the activation of deicing or defogging heaters. Absent a way to detect these moisture accumulations, the only other alternative is to have some sort of temperature based activation threshold or other non-smart means.

In accordance with embodiments, an imaging system equipped with amelioration systems can clean its window as a result of contaminate detection. Activation of the amelioration system can be triggered when the detected level of contaminates on a window exceed a threshold. An amelioration system can include, but is not limited to, fluid dispenser (e.g., water, cleaner, hydrophobic, oleophobic), vibratory cleaning, wiper blade and motor, heater, blower, defogger, etc.

Figure 1:
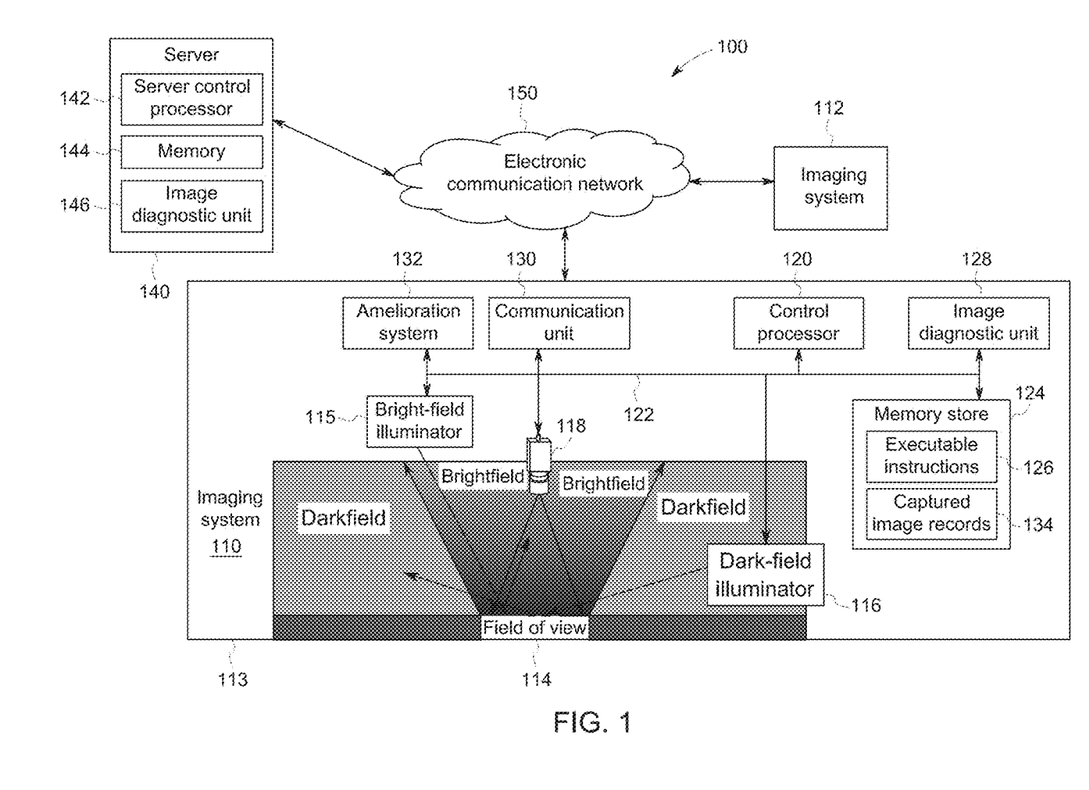
FIG. 1 depicts a back-side, dark-field illumination system in accordance with embodiments.

FIG. 1 depicts system 100 in accordance with embodiments. System 100 can include one or more imaging system 110, 112 positioned remotely from server 140. Each imaging system 110, 112 can include back-side illuminator sources—bright-field illuminator source 115, and dark-field illuminator source 116. These back-side illuminator sources illuminate window 114 of housing 113 that contains the imaging system.

Imaging system 110, 112 can include control processor 120 that communicates with other components of the imaging system across data/communication bus 122. Control processor 120 accesses computer executable instructions 126, which can be stored in memory store 124. Imaging systems 110, 112 can be in bidirectional communication with remote server 140 across electronic communication network 150.

Electronic communication network 150 can be, can comprise, or can be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that techniques and systems disclosed herein are not limited by the nature of network 150.

Bright-field illuminator source 115 can illuminate objects within a field-of-view (FOV) of image capture device 118 from a high angle. Light emitting from bright-field illuminator source 115 can cause a bright-filed region within a portion of the interior of the imaging system's housing, and a dark-field region within another interior portion of the housing. In accordance with embodiments, bright-field illuminator source can be positioned within the bright-field region of the housing.

In accordance with embodiments, dark-field illuminator source 116 can be positioned within the dark-field region of the housing. The dark-field illuminator source can illuminate the housing window from a low angle. The light emitting from the dark-field illuminator source can generate back scattering within the imaging system field-of-view from contaminate particles and/or droplets on the window. It is these contaminate particles, droplets, etc. that can change the quality of the image. The image can be captured by image capture device 118, which can provide digital images to image diagnostic unit 128. The captured images can be stored in captured image records 134.

Image diagnostic unit 128 can quantify a change in image quality between images captured with and without the dark-field illumination. The image diagnostic unit can perform its image diagnostics under control and/or instruction of control processor 120. In one implementation the image diagnostics can include frame subtraction of a current frame from a reference frame—where diagnostics is done with disregard to the subject in field-of-view; other implantations can perform the subtraction using a current frame and an earlier frame to determine an amount of degradation in the field-of-view over some period of time.

This quality change can manifest itself as bright spots in the image that were not present in the non-illuminated image, as well as in a reduction of the overall contrast range of the scene due to softening from fog or other widely distributed contamination. In accordance with embodiments, a map can be created that locates the contaminants that are detected. The diagnostics can determine the amount of anomalies within an image's region of interest. Image areas outside this region of interest could tolerate higher degradation. For example, a traffic enforcement camera system could tolerate less image quality outside the regions where a traffic light and vehicle license plate are captured.

In accordance with embodiments, a determination can be made that quantifies an image degradation quality factor that represents the image degradation caused by the contaminants. If the degradation quantification exceeds a first predetermined threshold, an alert message can be reported to remote server 140. Receipt of the alert message at the remote server can trigger the issuance of a work order requesting that a maintenance crew be sent to the associated imaging system that generated the alert message. In some implementations, evaluation of the alert message can result in transmission of a message from remote server 140 to imaging system 110, 112. This message can remotely activate amelioration system 132.

In some implementations, the degradation quantification can also trigger local activation of amelioration system 132, which can implement procedures to clear contaminants from the housing window. Triggering an amelioration system can occur based on exceeding the same predetermined threshold as used to generate the alert message. In addition, exceeding a second predetermined threshold (lower than the first) can trigger the amelioration system, so as to clear the housing window without the need to send a maintenance crew.

The alert message to remote server 140 can be sent by communication unit 130 across electronic communication network 150. Communication unit 130 can have wired and/or wireless communication capability depending on location accessibility, and other parameters, of where imaging system 110, 112 is installed (e.g., atop a pole or radio tower, wall mounted, proximity to service center, etc.).

In some implementations, the images captured by image capture device 118 can be transmitted to the remote server for storage in memory 144. In such an implementation, the quality degradation can be performed by image diagnostic unit 146 under the control of server control processor 142 executing computer executable instructions within memory 144.

Figure 2A:
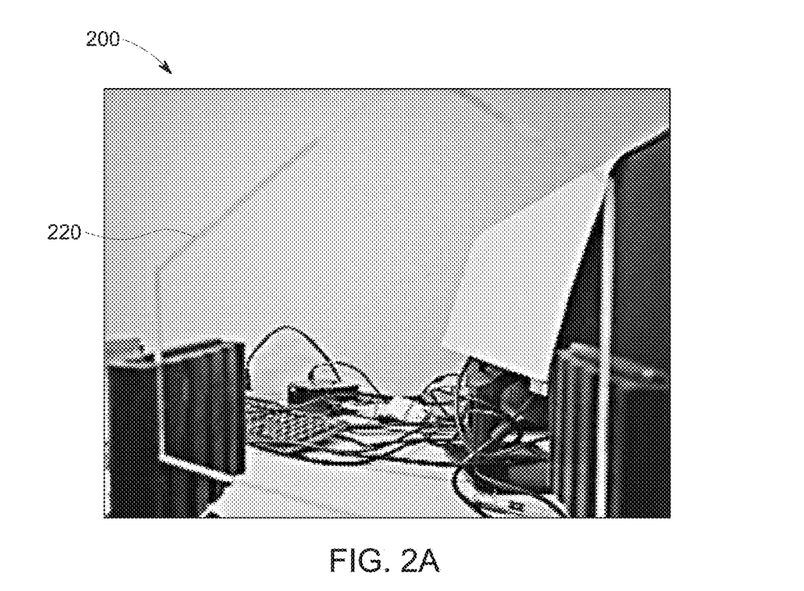
FIG. 2A depicts an image capture through anti-reflection coated glass without an embodying dark-field illumination system activated.

FIG. 2A depicts image 200 captured by an experimental model in accordance with embodiments. Image 200 is a result without dark field illumination—i.e., dark-field illuminator source 116 not activated. Image 200 itself was captured through glass 220 (representing window 114), which is coated with an anti-reflection material. Surface particles are on the distal surface of glass 220. These surface particles in image 200 are not observable to a human eye.

Figure 2B:
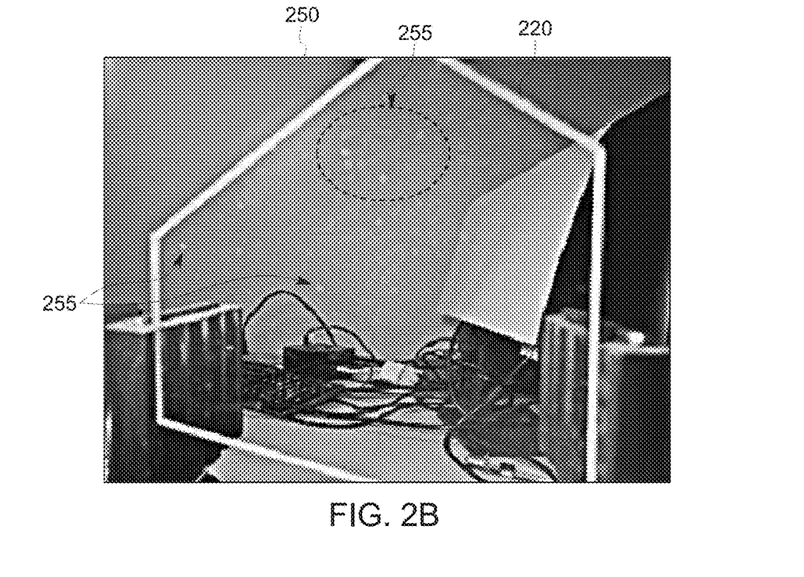
FIG. 2B depicts the image of FIG. 2A illuminated with a back-side, dark-field illumination system activated in accordance with embodiments.

The presence of the surface particles can act as optical noise that could impact the reliability and overall performance of an analytic system evaluating the captured image. FIG. 2B depicts image 250 captured with the same conditions as FIG. 2A, but with dark-field illuminator source 116 activated in accordance with embodiments. Observable in image 250 are multiple surface particle contaminants 255, which appear as bright spots on glass 220.

Figure 3A:
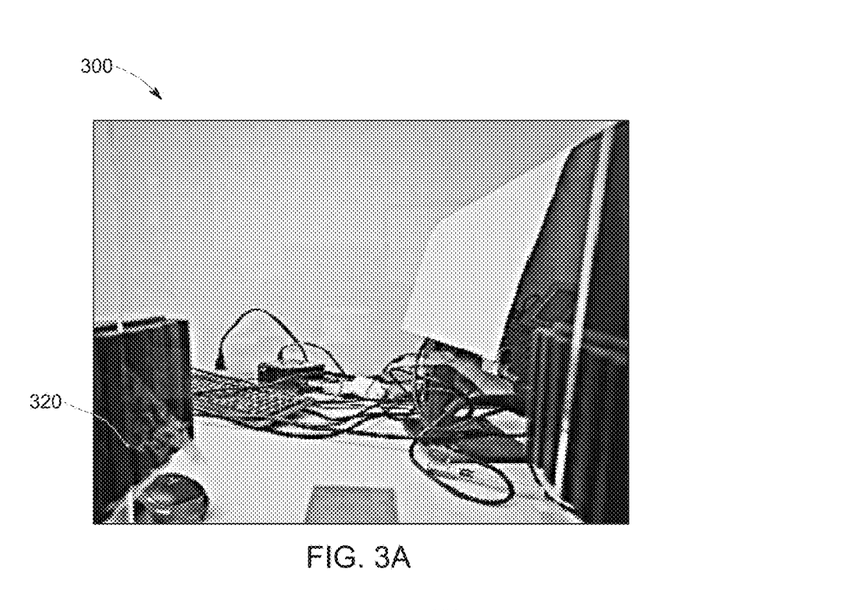
FIG. 3A depicts an image capture through bare glass without an embodying dark-field illumination system activated.

FIG. 3A depicts image 300 captured by an experimental model in accordance with embodiments. Image 300 is a result without dark field illumination—i.e., dark-field illuminator source 116 not activated. Image 300 itself was captured through glass 320 (representing window 114), which is bare glass with no surface coatings. Surface particles are on the distal surface of glass 320. These surface particles in image 300 are not observable to a human eye.

Figure 3B:
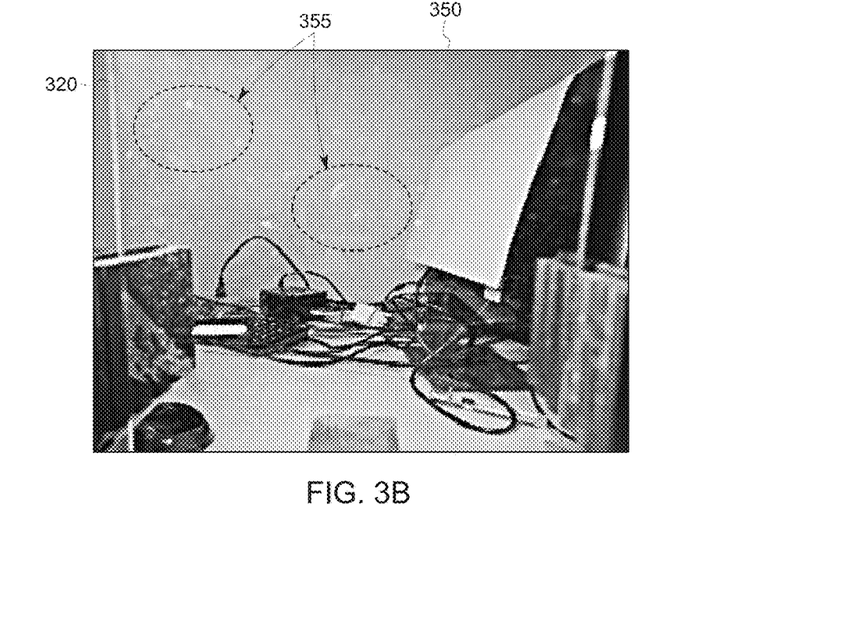
FIG. 3B depicts the image of FIG. 3A illuminated with a back-side, dark-field illumination system activated in accordance with embodiments.

The presence of the surface particles can act as optical noise that could impact the reliability and overall performance of an analytic system evaluating the captured image. FIG. 3B depicts image 350 captured with the same conditions as FIG. 3A, but with dark-field illuminator source 116 activated in accordance with embodiments. Observable in image 350 are multiple surface particle contaminants 355, which appear as bright spots on glass 320.

Figure 4A:
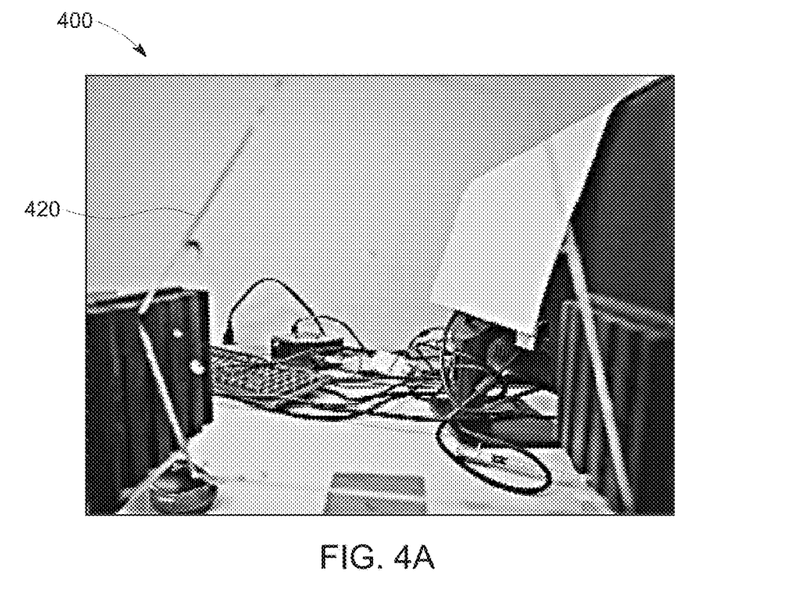
FIG. 4A depicts an image capture through anti-reflection coated glass without an embodying dark-field illumination system activated.

FIG. 4A depicts image 400 captured by an experimental model in accordance with embodiments. Image 400 is a result without dark field illumination—i.e., dark-field illuminator source 116 not activated. Image 400 itself was captured through glass 420 (representing window 114), which is coated with an anti-reflection material. Surface water droplets are on the distal surface of glass 420. These surface water droplets in image 400 are not observable to a human eye.

Figure 4B:
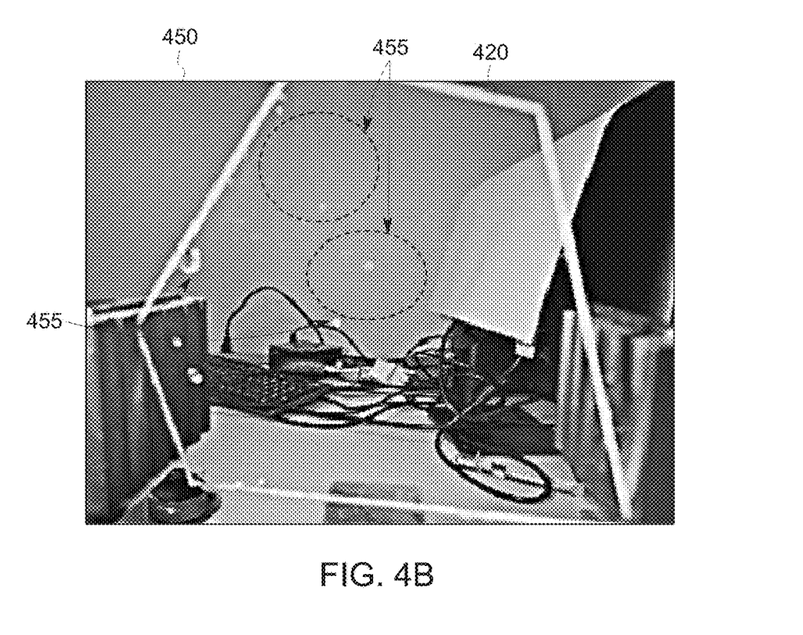
FIG. 4B depicts the image of FIG. 4A illuminated with a back-side, dark-field illumination system activated in accordance with embodiments.

The presence of the surface water droplets can act as optical noise that could impact the reliability and overall performance of an analytic system evaluating the captured image. FIG. 4B depicts image 450 captured with the same conditions as FIG. 4A, but with dark-field illuminator source 116 activated in accordance with embodiments. Observable in image 450 are multiple surface water droplet contaminants 455, which appear as bright spots on glass 420.

Figure 5A:
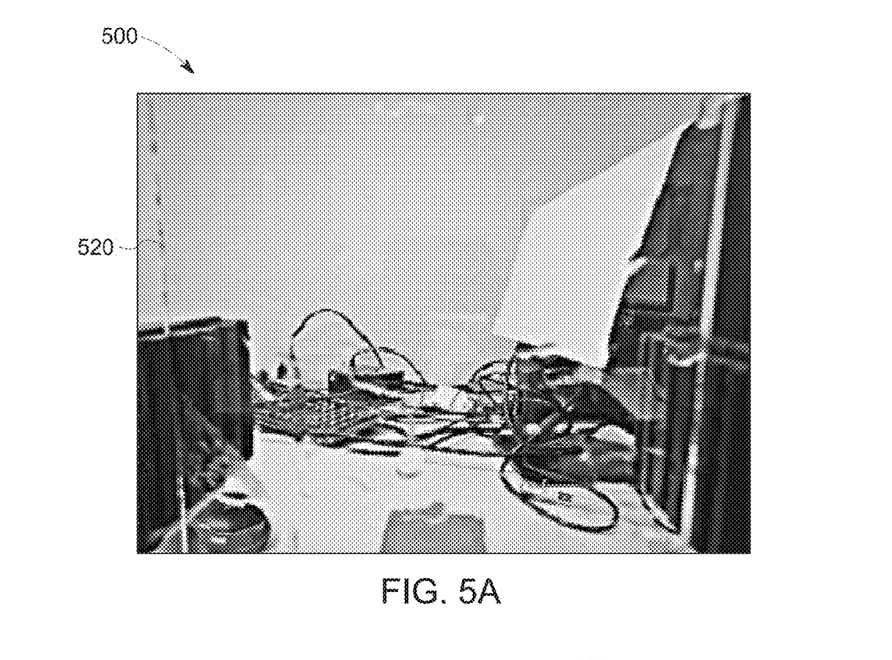
FIG. 5A depicts an image capture through bare glass without an embodying dark-field illumination system activated.

FIG. 5A depicts image 500 captured by an experimental model in accordance with embodiments. Image 500 is a result without dark field illumination—i.e., dark-field illuminator source 116 not activated. Image 500 itself was captured through glass 520 (representing window 114), which is bare glass with no surface coatings. Surface water droplets are on the distal surface of glass 520. These surface water droplets in image 500 are not observable to a human eye.

Figure 5B:
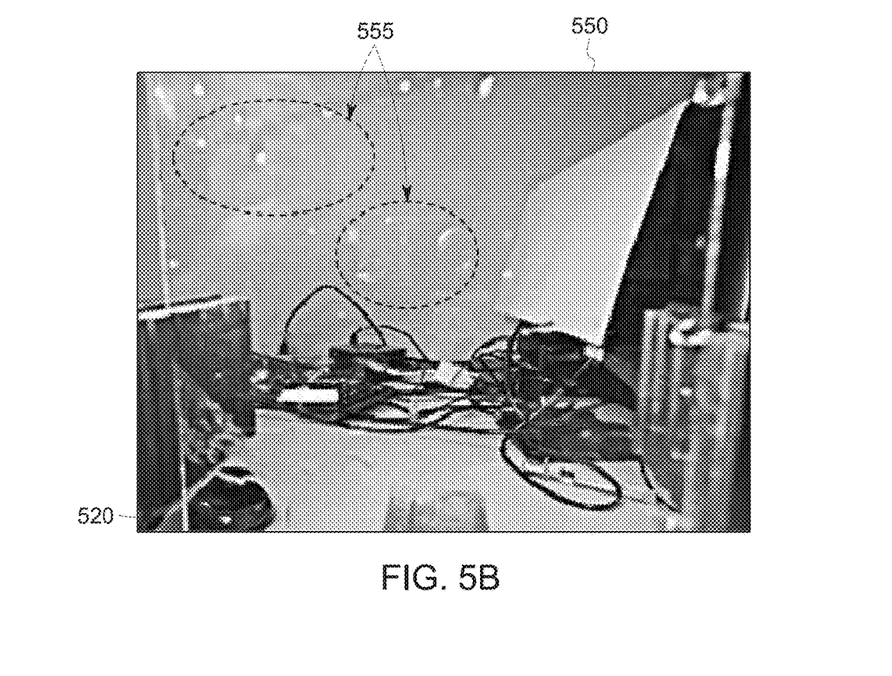
FIG. 5B depicts the image of FIG. 5A illuminated with a back-side, dark-field illumination system activated in accordance with embodiments.

The presence of the surface water droplets can act as optical noise that could impact the reliability and overall performance of an analytic system evaluating the captured image. FIG. 5B depicts image 550 captured with the same conditions as FIG. 5A, but with dark-field illuminator source 116 activated in accordance with embodiments. Observable in image 550 are multiple surface water droplet contaminants 555, which appear as bright spots on glass 520.

Figure 6A:
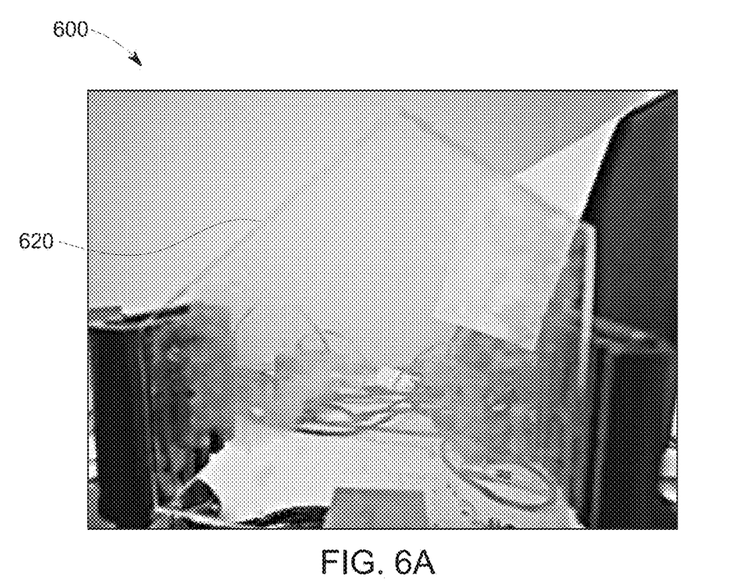
FIG. 6A depicts an image capture through anti-reflection coated glass without an embodying dark-field illumination system activated.

FIG. 6A depicts image 600 captured by an experimental model in accordance with embodiments. Image 600 is a result without dark field illumination—i.e., dark-field illuminator source 116 not activated. Image 600 itself was captured through glass 620 (representing window 114), which is coated with an anti-reflection material. Surface fog (e.g., condensation) is on the distal surface of glass 620. The surface fog in image 600 is not observable to a human eye.

Figure 6B:
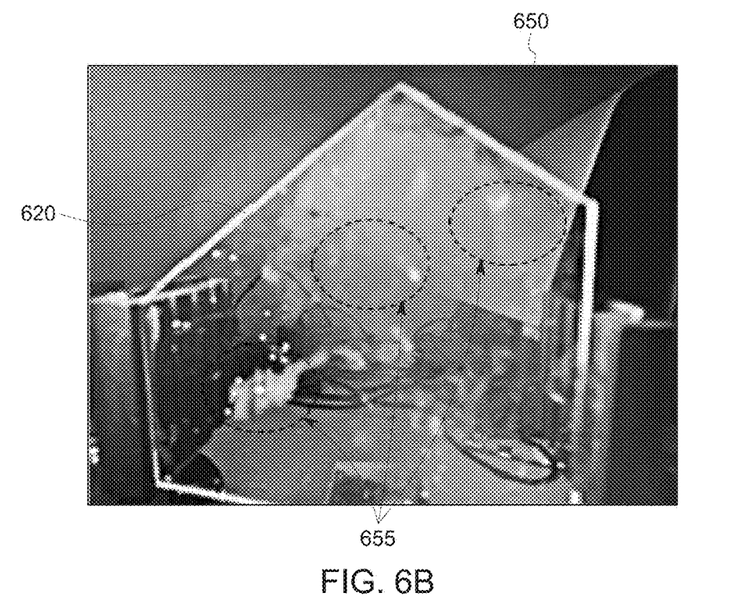
FIG. 6B depicts the image of FIG. 6A illuminated with a back-side, dark-field illumination system activated in accordance with embodiments.

The presence of the surface fog can act as optical noise that could impact the reliability and overall performance of an analytic system evaluating the captured image. FIG. 6B depicts image 650 captured with the same conditions as FIG. 6A, but with dark-field illuminator source 116 activated in accordance with embodiments. Observable in image 650 are multiple instances of surface fog contaminants 655, which appear as bright spots on glass 620.

Figure 7A:
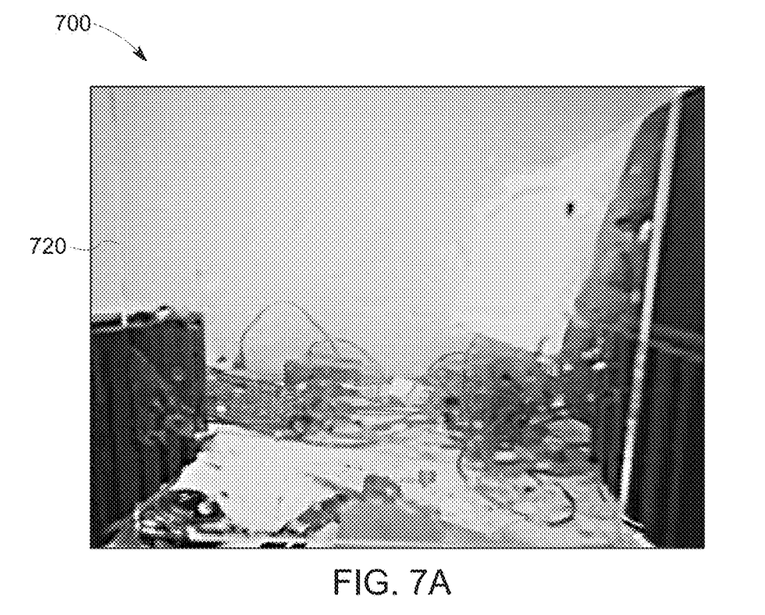
FIG. 7A depicts an image capture through bare glass without an embodying dark-field illumination system activated.

FIG. 7A depicts image 700 captured by an experimental model in accordance with embodiments. Image 700 is a result without dark field illumination—i.e., dark-field illuminator source 116 not activated. Image 700 itself was captured through glass 720 (representing window 114), which is bare glass with no surface coatings. Surface fog (e.g., condensation) is on the distal surface of glass 720. The surface fog in image 700 is not observable to a human eye.

Figure 7B:
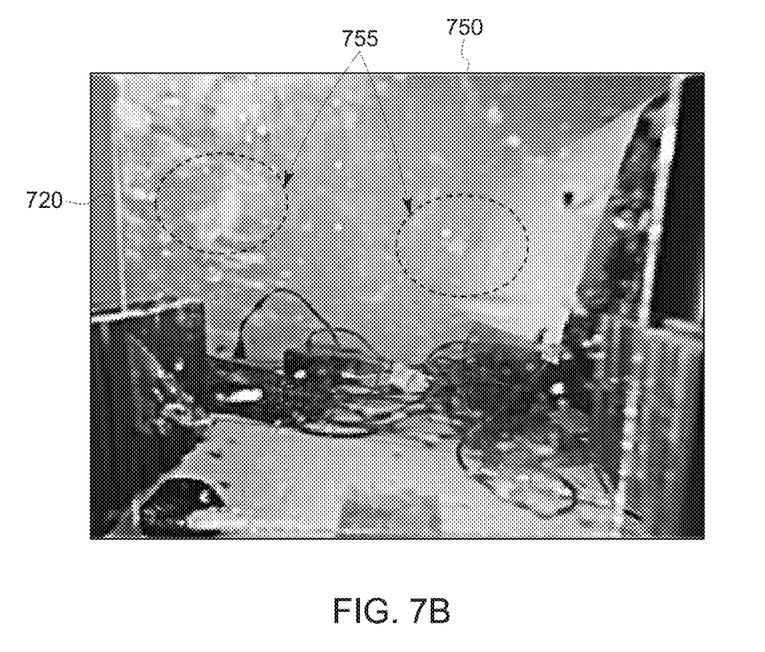
FIG. 7B depicts the image of FIG. 7A illuminated with a back-side, dark-field illumination system activated in accordance with embodiments.

The presence of the surface fog can act as optical noise that could impact the reliability and overall performance of an analytic system evaluating the captured image. FIG. 7B depicts image 750 captured with the same conditions as FIG. 7A, but with dark-field illuminator source 116 activated in accordance with embodiments. Observable in image 750 are multiple instances of surface fog contaminants 755, which appear as bright spots on glass 720.

Comparison of the images depicted in FIGS. 2A-7B with differing surface contaminants and obtained with/without activation of an embodying dark-field illuminator source demonstrate that the various surface contaminants appear as bright spots on the window in the field-of-view of an imaging system when the dark-field illuminator source is activated.

Contaminant build-up on the window surface can occur over a long period of time. The build-up can be a be a subtle change resulting in loss of overall sensitivity in the image. In an acute situation, such as a freezing rain storm, an embodying imaging system (e.g., a computer-based machine vision system) could be able to detect droplets or ice accumulation on the window. The detection of contamination and/or degradation of the image can result in the activation of a suitable, computer-controlled amelioration system (e.g., here window heaters to expel the moisture or melt the ice accumulation). The computer-controlled amelioration system can also control the application of cleaning fluids, wipers, and other devices or approaches to clear the surface of the window.

In accordance with embodiments, control processor 120 and associated components of imaging system 110, 112 can be implemented as a single-board computer. In accordance with embodiments, image diagnostic unit 128 can quantify the image degradation by subtracting images taken with and without the dark-field illumination (e.g., beating together differences). Differences in these images indicates the location, size, and quantity of contamination on the window surface. These differences can be quantified into a quality factor. The quality factor can then be compared to one or more thresholds. If a threshold is exceeded, the computer can activate one or more amelioration systems that can clear and/or clean the window.

The dark-field illuminator source 116, located in the dark field interior portion of the imaging system, can be synchronized under instruction from the control processor to the frame acquisition rate of image capture device 118. This synchronization can allow imaging system 110, 112 to acquire at least some images without contamination being illuminated (i.e., with dark-field illuminator source 116 not active). In accordance with embodiments, the dark-field illuminator source need only be operated at predetermined, or random, intervals for a brief period, one or two frames as an example, to obtain one or more images for analysis. This brief use of the dark-field illuminator could be imperceptible to the human observer.

Dark-field illuminator source 116 can be located on the physical camera board itself, or elsewhere in the housing. Control of the dark-field illuminator source can be as part of the imaging system command control architecture. The dark-field illuminator source could be used to provide indication as to the health of the camera, and/or to signal some other operational condition within the camera. For example, illumination of the dark-field illuminator source could be interpreted as the camera operating properly, or could be blinked at various frequencies and/or strobe patterns to provide visual indication of one or more status checks within the system. Each of these illuminations can be visible to an observer.

Embodying systems can detect and ameliorate the presence of environmental obstructions (e.g., particles such as water droplets, fogging, oil particles, oil film, dirt, soil, ice, snow, etc.) on the housing window.

An embodying system can include an imaging apparatus operating under computer control. The imaging apparatus can include a housing, an optical sensor (e.g., an optical sensor for visible light, e.g., a camera) at least partially enclosed within the housing, and a transparent panel (e.g., window, lens, etc.) positioned in the housing such that visible light (e.g., sunlight, images, ambient exterior light, street lighting, indoor lighting, ambient interior light) can enter the imaging apparatus through the transparent panel.

The housing can include an interior region having at least a bright zone and one or more dark zones. The bright zone can include the portion of the interior region which is capable of being illuminated by visible light entering the imaging apparatus through window 118. A dark zone is generally defined as the portion of the interior region which is in a shadowed region, or which is typically not capable of being illuminated by visible light entering the imaging apparatus through the transparent panel.

Dark-field illuminator source 118 can be a light emitting diode, which can emit white light, or colored light (e.g., red, blue, green, or combination thereof). The dark-field illuminator source can be positioned within the housing in a dark zone—i.e., in a shadow area.

Figure 8:
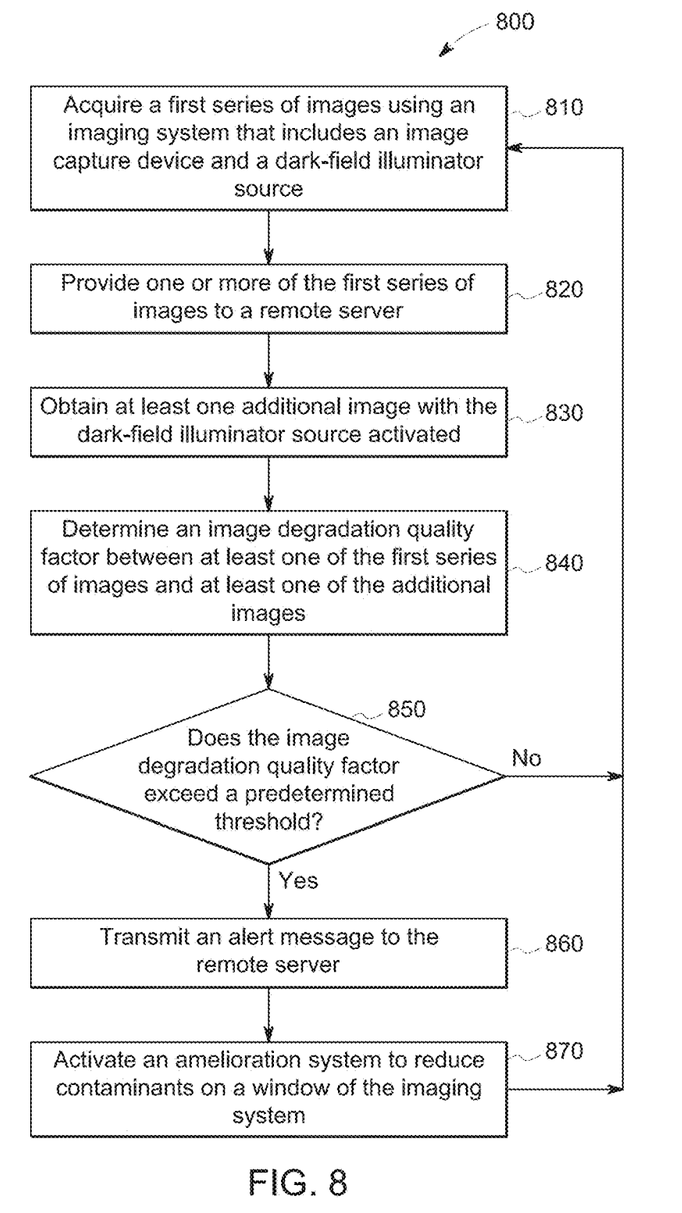
FIG. 8 depicts a process for quantifying degradation of a captured image in accordance with embodiments.

FIG. 8 depicts process 800 for quantifying degradation of a captured image in accordance with embodiments. A first series of images can be acquired, step 810, by image capture device 118 with dark-field illuminator source 116 not activated. These acquired images can be stored in captured image records 134. Imaging system 110, 112 can provide one or more of the first series of images, step 820, to remote server 140 across electronic communication network 150.

During the acquisition of the first series of images, at least one additional image can be obtained, step 830, with dark-field illuminator source 116 activated. Activation of the dark-field illuminator source can cause the additional image(s) to have bright spots caused by contaminants present on an exterior surface of window 114. Image diagnostic unit 128 can determine, step 840, an image degradation quality factor. This quality factor can be based on comparing at least one image of the first series of images with at least one image of the additional image. In some implementations, the comparison can be done using more than one of these images. The quality factor can be compared, step 850, to a predetermined threshold. If the quality factor does not exceed the predetermined threshold, process 800 can continue to step 810.

If the quality factor exceeds the predetermined threshold, process 800 can continue to step 860. An alert message can be transmitted, step 860, to remote server 140. Amelioration system 132 can be activated, step 870, to clear contaminants from window 114. The amelioration system can be activated after the imaging system receives a message from the remote server. In some implementations, the amelioration system can be activated locally without instruction from the remote server. Process 800 continues to step 810 for acquisition of more images.

In accordance with embodiments, a computer program application stored in non-volatile memory or computer-readable medium (e.g., register memory, processor cache, RAM, ROM, hard drive, flash memory, CD ROM, magnetic media, etc.) may include program code and/or computer executable instructions that when executed may instruct and/or cause a controller or processor to perform methods discussed herein such as a method for detecting and quantifying degradation of image quality from window contaminants, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A system comprising:
   an imaging system including a housing having a window;
   an imaging device within the housing having a field of view that contains at least a portion of the window;
   a dark-field illuminator source located in a dark-field region within the housing, the dark-field illuminator source directed at that portion of the window within the field of view;
   a control processor in communication with the imaging device and configured to execute instructions that cause the imaging device to acquire a first series of images with the dark-field illuminator source not activated;
   the control processor configured to control activation of the dark-field illuminator source;
   the imaging device configured to capture additional images during acquisition of the first series of images, the additional images captured during periods when the dark-field illuminator source is activated; the system further including:
   an image diagnostic unit configured to compare at least one image of the first series of images with at least one of the additional images;
   the image diagnostic unit configured to determine a quality factor quantifying a degradation in image quality based on the comparison.

2. The system of claim 1, including the image diagnostic unit configured to evaluate if the quality factor exceeds a first predetermined threshold.

3. The system of claim 2, including a communication unit configured to transmit an alert message to the remote server if the quality factor exceeds the first predetermined threshold.

4. The system of claim 2 including an amelioration system, the control processor configured to:
   cause the image diagnostic unit to evaluate if the quality factor exceeds a second predetermined threshold, the second predetermined threshold lower than the first predetermined threshold; and
   activate the amelioration system if the quality factor is between the first and the second predetermined thresholds.

5. The system of claim 3 including an amelioration system, the control processor configured to activate the amelioration system in response to a message received from the remote server.

6. The system of claim 1, including the control processor configured to control activation of the dark-field illuminator source in synchronization with a frame acquisition rate of the first series of images.

7. A method comprising:
   acquiring a first series of images using an imaging system that includes an image capture device and a dark-field illuminator source, the first series of images acquired with the dark-field illuminator source inactive;
   obtaining one or more additional images during acquisition of the first series of images, the one or more additional image captured when the dark-field illuminator source is activated;
   comparing by an image diagnostic unit at least one image of the first series of images with at least one of the one or more additional images; and
   determining a quality factor quantifying a degradation in image quality based on the results of the comparison.

8. The method of claim 7, including:
evaluating if the quality factor exceeds a first predetermined threshold; and
transmitting an alert message to a remote server connected to the imaging system if the quality factor does exceed the first threshold.

9. The method of claim 8, including:
receiving an instruction from the remote server; and
activating an amelioration system in response to the received instruction.

10. The method of claim 7, including:
evaluating if the quality factor exceeds a second predetermined threshold, the second predetermined threshold lower than the first predetermined threshold; and
activating an amelioration system if the quality factor is between the first and the second predetermined thresholds.

11. A non-transitory computer readable medium having stored thereon instructions which when executed by a processor cause the processor to:
acquire a first series of images using an imaging system that includes an image capture device and a dark-field illuminator source, the first series of images acquired with the dark-field illuminator source inactive;
obtain one or more additional images during acquisition of the first series of images, the one or more additional image captured when the dark-field illuminator source is activated;
compare by an image diagnostic unit at least one image of the first series of images with at least one of the one or more additional images; and
determine a quality factor quantifying a degradation in image quality based on the results of the comparison.

12. The non-transitory computer readable medium of claim 11, further including executable instructions to cause the processor to:
evaluate if the quality factor exceeds a first predetermined threshold; and
transmit an alert message to a remote server connected to the imaging system if the quality factor does exceed the first threshold.

13. The non-transitory computer readable medium of claim 12, further including executable instructions to cause the processor to:
receive an instruction from the remote server; and
activate an amelioration system in response to the received instruction.

14. The non-transitory computer readable medium of claim 11, further including executable instructions to cause the processor to:
evaluate if the quality factor exceeds a second predetermined threshold, the second predetermined threshold lower than the first predetermined threshold; and
activate an amelioration system if the quality factor is between the first and the second predetermined thresholds.

* * * * *